US011323874B2

(12) United States Patent
Yoo et al.

(10) Patent No.: US 11,323,874 B2
(45) Date of Patent: May 3, 2022

(54) METHOD AND APPARATUS FOR PERFORMING HANDOVER IN WIRELESS COMMUNICATION SYSTEM

(71) Applicant: Samsung Electronics Co., Ltd., Suwon-si (KR)

(72) Inventors: Seungbo Yoo, Yongin-si (KR); Daejoong Kim, Yongin-si (KR); Hoon Chang, Seoul (KR); Namryul Jeon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 16/313,282

(22) PCT Filed: Jul. 7, 2017

(86) PCT No.: PCT/KR2017/007292
§ 371 (c)(1),
(2) Date: Dec. 26, 2018

(87) PCT Pub. No.: WO2018/009021
PCT Pub. Date: Jan. 11, 2018

(65) Prior Publication Data
US 2019/0253942 A1    Aug. 15, 2019

(30) Foreign Application Priority Data
Jul. 8, 2016    (KR) .................. 10-2016-0087139

(51) Int. Cl.
*H04W 12/08*    (2021.01)
*H04W 76/40*    (2018.01)
(Continued)

(52) U.S. Cl.
CPC ..... *H04W 12/041* (2021.01); *H04W 12/0433* (2021.01); *H04W 24/10* (2013.01);
(Continued)

(58) Field of Classification Search
CPC ............ H04W 36/08; H04W 36/0011; H04W 76/025; H04W 12/08; H04W 72/042;
(Continued)

(56) References Cited

U.S. PATENT DOCUMENTS

| 8,284,734 | B2 * | 10/2012 | Meylan | ............. | H04W 36/0055 370/331 |
| 2009/0201884 | A1 * | 8/2009 | Chaponniere | ......... | H04W 92/20 370/332 |
| 2011/0274085 | A1 * | 11/2011 | Geary | ............... | H04W 36/0022 370/331 |
| 2011/0294508 | A1 * | 12/2011 | Min | .................. | H04W 36/0085 455/436 |

(Continued)

FOREIGN PATENT DOCUMENTS

| KR | 10-2009-0122236 A | 11/2009 |
| KR | 10-2011-0073181 A | 6/2011 |

(Continued)

OTHER PUBLICATIONS

Konstantinos Alexandris, et al. 'Analyzing X2 handover in LTE/LTE-A', In: Modeling and Optimization in Mobile, Ad Hoc, and Wireless Networks(WiOpt), 2016 14th International Symposium on, May 9-13, 2016.

(Continued)

Primary Examiner — Edan Orgad
Assistant Examiner — Vanneilian Lalchinthang
(74) Attorney, Agent, or Firm — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE).
A handover method for a terminal according to one embodiment of the present disclosure may include: receiving, from a source cell, a message including information on one or more target cells for performing a fast handover; and performing a fast handover by reusing a radio bearer based on the received information.

18 Claims, 14 Drawing Sheets

(51) Int. Cl.
*H04W 36/00* (2009.01)
*H04W 76/10* (2018.01)
*H04W 16/32* (2009.01)
*H04W 36/08* (2009.01)
*H04W 12/041* (2021.01)
*H04W 24/10* (2009.01)
*H04W 36/04* (2009.01)
*H04W 12/0433* (2021.01)
*H04W 76/27* (2018.01)
*H04W 74/08* (2009.01)
*H04W 80/02* (2009.01)
*H04W 80/08* (2009.01)

(52) U.S. Cl.
CPC ....... *H04W 36/0038* (2013.01); *H04W 36/04* (2013.01); *H04W 36/08* (2013.01); *H04W 74/0833* (2013.01); *H04W 76/27* (2018.02); *H04W 80/02* (2013.01); *H04W 80/08* (2013.01)

(58) Field of Classification Search
CPC ............. H04W 12/041; H04W 12/04; H04W 36/00835; H04W 16/32; H04W 36/0061; H04W 12/0433; H04W 24/10; H04W 36/0055; H04W 84/045; H04W 88/12; H04W 36/0038; H04W 36/0058; H04W 74/0808; H04W 84/042; H04W 36/04; H04W 74/0833; H04W 36/32; H04W 76/046; H04W 88/08; H04W 76/27; H04W 80/02; H04W 80/08; H04W 74/08; H04W 36/30; H03M 13/09
USPC ............................................. 70/331; 370/331
See application file for complete search history.

(56) References Cited

U.S. PATENT DOCUMENTS

| | | | |
|---|---|---|---|
| 2012/0231796 A1* | 9/2012 | Meylan | H04W 36/0055 455/436 |
| 2015/0038145 A1* | 2/2015 | Nakata | H04W 36/0055 455/436 |
| 2015/0173120 A1* | 6/2015 | Yamada | H04W 76/27 370/331 |
| 2015/0215838 A1* | 7/2015 | Li | H04W 36/30 370/331 |
| 2015/0249941 A1* | 9/2015 | Wang | H04W 36/06 370/329 |
| 2015/0341835 A1* | 11/2015 | Bontu | H04W 76/27 370/331 |
| 2016/0014647 A1* | 1/2016 | Yi | H04W 36/0072 370/331 |
| 2016/0057585 A1* | 2/2016 | Horn | H04W 40/248 370/312 |
| 2016/0309375 A1* | 10/2016 | Dai | H04W 12/04031 |
| 2017/0064589 A1* | 3/2017 | Liu | H04W 36/0055 |
| 2017/0272985 A1* | 9/2017 | Axen | H01P 3/12 |
| 2018/0035339 A1* | 2/2018 | Mitsui | H04W 72/04 |
| 2019/0159024 A1* | 5/2019 | Rost | H04W 16/00 |

FOREIGN PATENT DOCUMENTS

| | | |
|---|---|---|
| KR | 10-2015-0137064 A | 12/2015 |
| WO | 2014/040245 A1 | 3/2014 |
| WO | 2015-143578 A1 | 10/2015 |

OTHER PUBLICATIONS

Extended European Search Report dated Feb. 15, 2019, issued in the European Application No. 17824577.5.

* cited by examiner

METHOD AND APPARATUS FOR PERFORMING HANDOVER IN WIRELESS COMMUNICATION SYSTEM

TECHNICAL FIELD

Various embodiments of the present disclosure relate to a wireless communication system, and more particularly, to a method and apparatus for improving a handover procedure when a terminal moves between cells.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, there is a need for a method for improving performance of a terminal by minimizing an inefficient process in a handover procedure in which the terminal moves between the cells.

DISCLOSURE OF INVENTION

Technical Problem

An object of the present disclosure is directed to provision of a method and an apparatus for reducing latency and performing handover with improved performance by minimizing inefficient processes such as user plane reset or security key update which may occur during a handover in a wireless communication system.

Solution to Problem

Various embodiments of the present disclosure are directed to the provision of a handover method of a terminal in a wireless communication system, including: receiving, from a source cell, a message including information on one or more target cell for performing a fast handover; and performing the fast handover by reusing a radio bearer based on the received information.

Various embodiments of the present disclosure are directed to the provision of a handover method of a source cell in a wireless communication system, including: receiving, from a terminal, a measurement report including a measurement result for one or more cell; determining one or more target cell performing a fast handover reusing a radio bearer based on the measurement report; and transmitting information on the one or more target cell determined to a terminal.

Various embodiments of the present disclosure are directed to the provision of a handover method of a target cell in a wireless communication system, including: receiving, from a terminal, a handover message including a new terminal identifier in case that a fast handover is completed; and reusing a security key corresponding to a source cell and radio bearers of a specific user plane protocol such as service data adaptation protocol (SDAP), packet data convergence protocol (PDCP), radio link control (RLC), a medium access control, or a physical layer based on the new terminal identifier of the received message.

Advantageous Effects of Invention

According to the embodiment of the present disclosure, the terminal can reduce the latency and perform the handover with improved performance.

MODE FOR THE INVENTION

Figure 1:
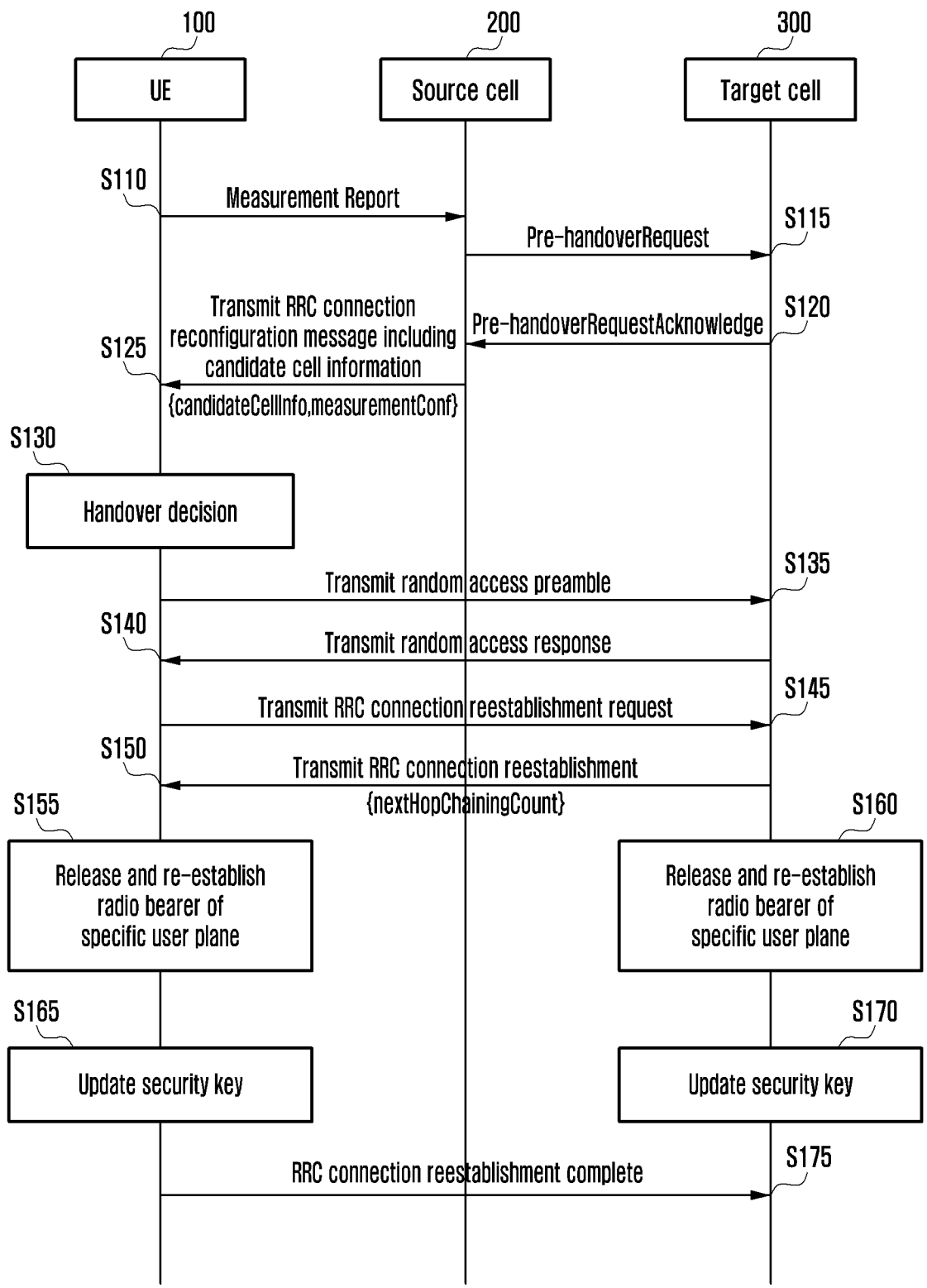
FIG. 1 is a sequence diagram illustrating a UE-based handover procedure according to a general method.

Hereinafter, embodiments of the present disclosure will be described in detail with reference to the accompanying drawings.

In describing the exemplary embodiments of the present disclosure in the present specification, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

Further, it may be understood that each block of processing flow charts and combinations of flow charts may be performed by computer program instructions. Since these computer program instructions may be mounted in processors for a general computer, a special computer, or other programmable data processing apparatuses, these instructions performed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes performed by the computer to thereby perform the computer or the other programmable data processing apparatuses may also provide steps for performing the functions described in block(s) of the flow charts.

In addition, each block may indicate some of modules, segments, or codes including one or more executable instructions for performing a specific logical function(s). Further, it is to be noted that functions mentioned in the blocks occur regardless of a sequence in some alternative embodiments. For example, two blocks that are consecutively illustrated may be substantially simultaneously performed in fact or be performed in a reverse sequence depending on corresponding functions sometimes.

Here, the term '~unit' used in the present embodiment means software or hardware components such as FPGA and ASIC and the '~unit' performs any roles. However, the meaning of the '~unit' is not limited to software or hardware. The '~unit' may be configured to be in a storage medium that may be addressed and may also be configured to reproduce one or more processors. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more CPUs within a device or a security multimedia card.

The terminal according to the embodiment of the present disclosure may generally include a mobile terminal and may indicate a device that is previously joined in a mobile communication system to receive a service from the mobile communication system. The mobile terminal may include smart devices such as a smart phone and a tablet PC, which is merely an example, and the present disclosure is not limited thereto.

A cellular wireless communication system performs a handover procedure when a serving cell of a mobile terminal needs to be changed. For example, when a terminal that has performed communication with a source cell has difficulty in performing communication due to a disconnection caused by an obstacle, or when the terminal moves from a region in a source cell to a region in a target cell, a handover to the target cell may be executed.

Hereinafter, a general handover procedure of a terminal will be described with reference to FIGS. 1 and 2.

FIG. 1 is a sequence diagram illustrating a general UE-based handover method. More specifically, a process of performing, by a terminal 100, a handover from a source cell 200 to a target cell 300 is illustrated. The source cell 200 and the target cell 300 may be cells for one base station or cells of different base stations.

First, in step S110, the terminal 100 may transmit a measurement report to the source cell 200. For example, the terminal 100 connected to the source cell 200 and performing communication may periodically measure a signal level and report the measured signal level to the source cell 200. Specifically, the terminal 100 may be set for a predetermined condition or a reporting period for the measurement report. According to the setup, the terminal 100 may perform the measurement report when satisfying the predetermined condition, or according to a predetermined reporting period.

If the source cell 200 and the target cell 300 are cells of different base stations (for example, inter-handover), then in step S115, the source cell 200 transmits a pre-handover request message to the target cell 300. In step S120, the target cell 300 may transmit acknowledgement to the received pre-handover request message.

For example, the source cell 200 may request the UE-based handover to the target cell 300 in advance through the pre-handover request message. If the target cell 300 receiving the pre-request may accommodate the handover, the target cell 300 may transmit an Ack message for the pre-handover request to the source cell 200 to accept the handover.

Meanwhile, in the steps S115 and S120, the case in which the inter-cell handover in the base station is performed may be omitted. For example, when the source cell 200 and the target cell 300 are cells of one base station, it is not necessary to transmit and receive the pre-handover request message and acknowledgement based on the measurement report of the terminal between the cells.

In step S125, the source cell 200 may provide, to the terminal 100, candidate cell information that the terminal 100 may be used in the handover determination, through an RRC connection reconfiguration message.

For example, as described above, one or more target cell that transmits the Ack message for the pre-handover request may be a candidate cell. Accordingly, the source cell 200 may transmit the RRC connection reconfiguration message which includes information on one or more target cell that transmits an Ack message for the pre-handover request. For example, the source cell 200 may transmit a cell ID as the information on the target cell.

In step S130, when the handover event is triggered, the terminal 100 may determine handover. For example, the terminal 100 may determine a target cell performing a handover based on the candidate cell information.

If the handover to the target cell 300 is determined by the terminal 100, the terminal 100 may perform an initial connection with the target cell 300 through a random access procedure.

For example, in step S135, the terminal 100 may transmit a random access preamble to the target cell 300. As a response to the random access preamble, the terminal 100 may receive a random access response message from the target cell 300 in step S140.

In step S145, the terminal 100 may transmit an RRC connection reestablishment request message to the target cell 300 and in step S150, receive an RRC connection reestablishment message.

By the above-mentioned process, in step S155 and step S160, the terminal 100 and the target cell 300 that the connection is completed may each release and then re-establish radio bearers of service data adaptation protocol (SDAP), packet data convergence protocol (PDCP), a radio link control (RLC), a medium access control, and a physical layer.

Specifically, the terminal 100 and the target cell 300 each reset a packet data unit (PDU) existing in a user plane protocol stack (for example, RLC and PDCP).

In step S165 and step S170, the terminal 100 and the target cell 300 may each update a security key.

For example, the source cell 200 may update the security key using a physical cell ID (PCID) of the target cell 300 and transmit the updated security key to the target cell 300. Accordingly, the target cell 300 receiving the updated security key may use the updated security key to encrypt or decrypt the transmitted/received data.

In addition, the source cell 200 may transmit parameters for updating the secret key from the terminal 100. The terminal 100 may generate the updated security key using the information received from the source cell 200. The terminal 100 that has completed the handover procedure may encrypt or decrypt data transmitted and received using the updated security key.

In step S175, the terminal 100 may transmit an RRC connection reestablishment complete message to the target cell 300.

Figure 2:
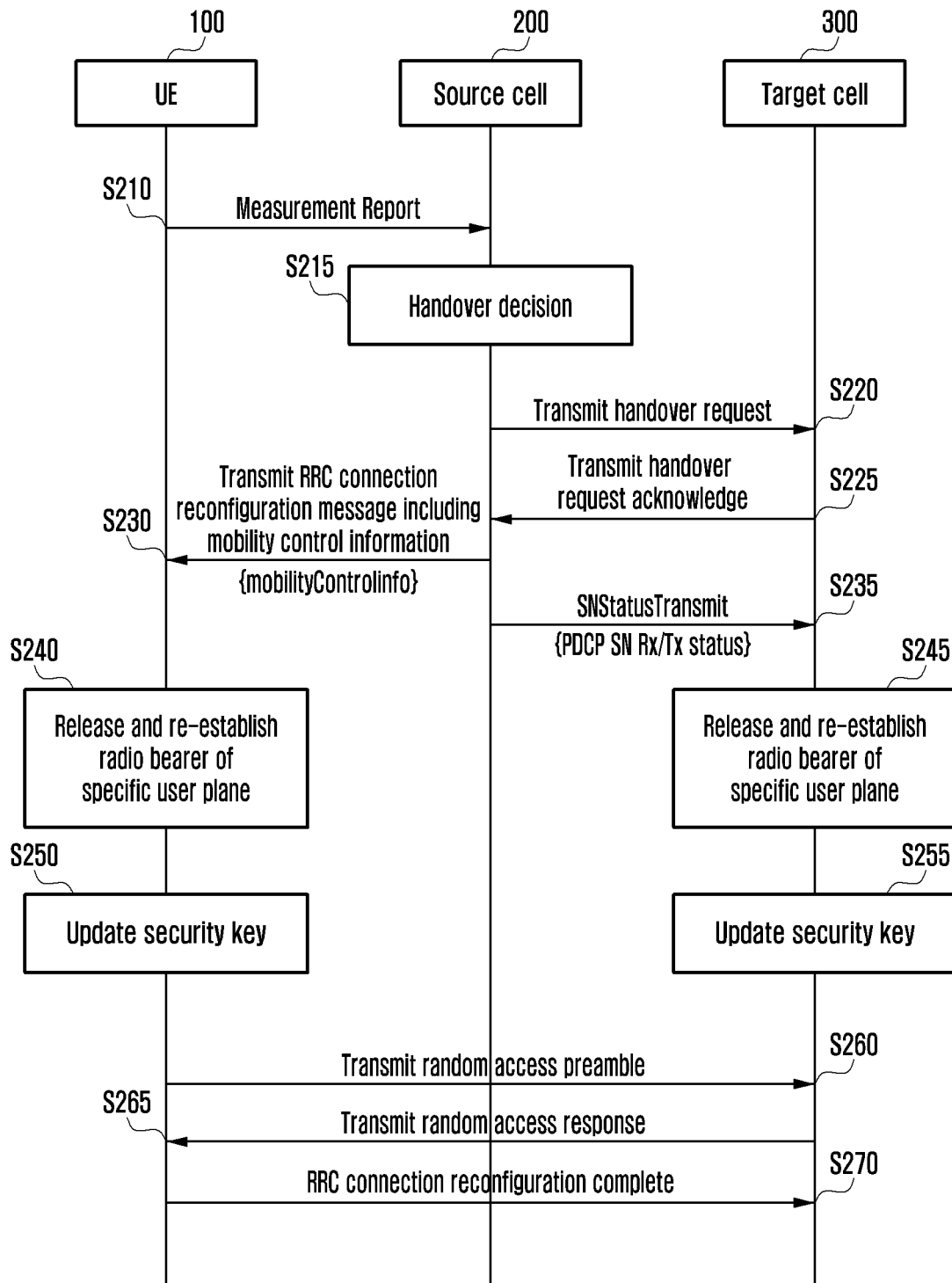
FIG. 2 is a sequence diagram illustrating a network-based handover procedure according to a general method.

Meanwhile, FIG. 2 is a sequence diagram illustrating a network-based (NW-based) handover procedure according to a general method. In FIG. 2, a difference from the UE-based handover procedure described with reference to FIG. 1 will be mainly described.

First, in step S210, the terminal 100 may transmit a measurement report to the source cell 200.

In step S215, the source cell 200 may determine a handover. For example, the source cell 200 may determine a target cell performing a handover based on the measurement report received from the terminal 100.

If the source cell 200 and the target cell 300 each are cells of different base stations, in step S220, the source cell 200 may transmit a handover request to the target cell 300. At this time, the source cell 200 may transmit the updated security key based on the physical cell ID (PCID) of the target cell 300.

In step S225, the target cell 300 which determines that the handover is acceptable may transmit a handover request response to the source cell 200.

In the steps S220 and S225, since the source cell 200 and the target cell 300 each are cells of different base stations, it is a necessary procedure only when an inter-base station handover is performed. Accordingly, when the source cell 200 and the target cell 300 are cells of the same base station, the above steps S220 and S225 may be omitted.

In step S230, the source cell 200 receiving the handover request response may transmit an RRC connection reconfiguration message including mobility control information to the terminal 100. At this time, the source cell 200 may transmit the information on the target cell 300 to be handed over to the terminal 100.

Meanwhile, if the source cell 200 and the target cell 300 each are cells of different base stations, in step S235, the source cell 200 may transmit a sequence number status (SNstatus) to the target cell 300. Specifically, the source cell 200 may transmit a sequence number of a packet of a PDCP layer to the target cell 300 through an interface between the base stations, and inform from which packet is to be transmitted and received to the terminal 100 after the handover is completed.

In the step S235, since the source cell 200 and the target cell 300 each are cells of different base stations, it is a necessary procedure only when the inter-base station handover is performed. Accordingly, when the source cell 200 and the target cell 300 are cells of the same base station, the above step S235 may be omitted.

Meanwhile, in step S240 and step S245, the terminal 100 and the target cell 300 may each reset radio bearers (RB) of service data adaptation protocol (SDAP), packet data convergence protocol (PDCP), radio link control (RLC), medium access control, and a physical layer.

In step S250 and step S255, the terminal 100 and the target cell 300 may each update a security key.

Meanwhile, in step S260, the terminal 100 may transmit the random access preamble to the target cell 300. As the response to the random access preamble, the terminal 100 may receive a random access response message from the target cell 300 in step S265.

In step S270, the terminal 100 may transmit the RRC connection reconfiguration complete message to the target cell 300 to complete the connection with the target cell 300.

In the UE-based and NW-based handover processes as shown in FIGS. 1 and 2, a radio bearer established in the source cell may be reset and re-established in the target cell. By the re-establishment, user data of the user plane protocol stack (for example, PDCP and RLC) may also be reset.

Further, when the cell is changed through the handover, the security key is updated. Therefore, even if the user data encrypted using the security key in the PDCP layer is transmitted to the target cell, the updated security key can not be decrypted.

On the other hand, when communication is performed in a high frequency band (for example, 28 GHz) as in the 5G system, the case in which the terminal is handed over to the target cell may be frequent for the reason that the communication with the source cell is impossible due to a deterioration in radio environment caused by a temporary obstacle between the base station and the terminal which provide the communication service.

At this time, the handover performance is important, and one of the performance factors may be a handover setup time. However, as described above, generally, the security key should be changed every time the cell is changed, and the existing user data should be reset, which is an inefficient structure. Therefore, there is a problem that it is difficult to perform a fast handover.

Hereinafter, a handover method for solving the above problems will be described in detail.

Figure 3:
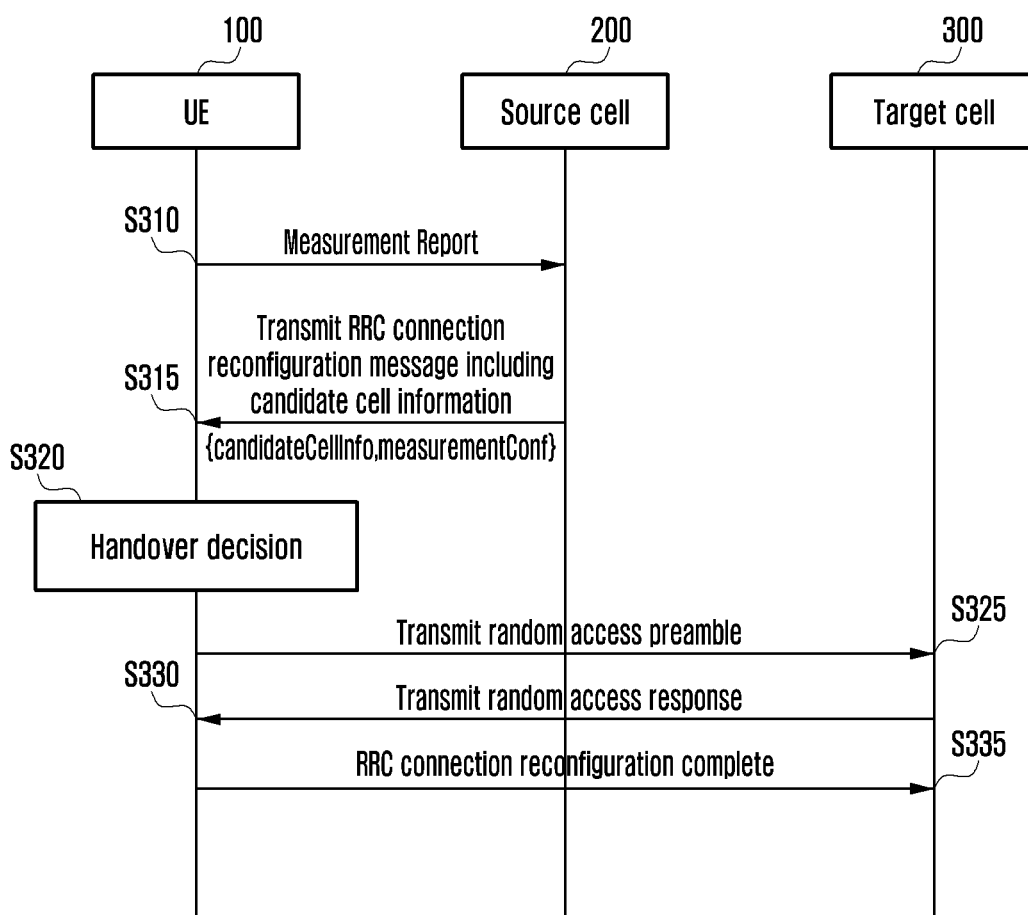
FIG. 3 is a sequence diagram illustrating an inter-cell handover procedure in a UE-based base station according to an embodiment of the present disclosure.

FIG. 3 is a sequence diagram illustrating an inter-cell handover procedure in a UE-based base station according to an embodiment of the present disclosure.

First, in step S310, the terminal 100 may transmit the measurement report to the source cell 200.

In step S315, the source cell 200 may transmit the RRC connection reconfiguration message to the terminal 100. At this time, the source cell 200 may provide, to the terminal 100, the candidate cell information that the terminal 100 may be used in the handover determination, through an RRC connection reconfiguration message.

For example, the source cell 200 may transmit, to the terminal 100, the information on the candidate cells that the terminal 100 may handover based on the measurement report. Among the candidate cells, one or more candidate cell capable of performing the fast HO may be provided.

Accordingly, the source cell 200 may transmit, as information on a candidate cell capable of performing the fast HO, the candidate cell information including a new terminal ID (for example, identifier (C-RNTI) which the target cell allocates) for the fast handover (hereinafter, fast HO), system information (SI) on the target cell, RACH information, and user protocol information to be reused according to a central unit (CU)-access unit (AU) function split option. In the fast HO, the user protocol configuration to be specified and reused in the target cell may include, for example, the following combinations.

Reuse only PDCP protocol
Reuse only PDCP, RLC protocols
Reuse only PDCP, RLC, MAC protocols
Reuse only PDCP, RLC, MAC, PHY protocols
Reuse only SDAP, PDCP protocols
Reuse only SDAP, PDCP, RLC protocols
Reuse only SDAP, PDCP, RLC, MAC protocols
Reuse only SDAP, PDCP, RLC, MAC, PHY protocols Specific examples of the candidate cell information are shown in Table 1 as follows.

TABLE 1

| Candidate Cell Info | Description | Option | Condition |
|---|---|---|---|
| candidateCellID | Physical Cell ID of Candidate Cell | Mandatory | Essential in UE-based HO (Apply for both normal and fast HOs) |
| newUE-Identity | C-RNTI of Candidate Cell | OPTIONAL | Essential in UE-based fast HO |
| radioResourceConfigCommon | Common radio resource configurations of Candidate Cell | OPTIONAL | Essential in UE-based fast HO |
| rach-ConfigDedicated | Dedicated random access parameters of Candidate Cell | OPTIONAL | Selective in UE-based fast HO |
| ReuseProtocolType | Target protocols (SDAP, PDCP, RLC, MAC, PHY) to be reused without being reset in fast handover | Mandatory | Essential in UE-based HO (Apply for both normal and fast HOs) |

Meanwhile, in step S320, when the handover event is triggered and the target cell is determined, the terminal 100 may determine whether it is the fast HO based on the candidate cell information on the determined target cell. For example, when performing handover between cells in a base station, the terminal 100 may be preset to perform the fast HO. Therefore, the terminal 100 may determine to execute the fast HO on the cell of the base station, such as the source cell 200, based on the candidate cell information.

In the case of the fast HO, the terminal does not reset the specific user plane protocols (that is, PDCP, RLC, MAC and PHY) according to a reuse protocol application target, and may also maintain the security key as a key used in the source cell.

The terminal 100 may perform a dedicated random access or a contention-based random access according to whether rach-ConfigDedicated is configured in the candidate cell information in order to perform the random access procedure with the target cell.

Specifically, the terminal 100 having determined to perform the fast HO to the target cell 300 may transmit the random access preamble to the target cell 300 in step S325. As the response to the random access preamble, in step S330, the terminal 100 may receive the random access response message from the target cell 300.

When the random access procedure is completed, in step S335, the terminal 100 may transmit the RRC connection reconfiguration complete message including the C-RNTI information on the candidate cell as a new terminal identifier to the target cell 300.

Accordingly, the target cell 300 may reuse the specific user plane protocol (e.g., PDCP/RLC) release of the source cell 200 and the security key without resetting the specific user plane protocol (e.g., PDCP/RLC) release of the source cell 200 and the security key using the received new terminal identifier. For example, the target cell 300 may use the security key of the source cell as it is. The target cell 300 may not perform the resetting of the specific user plane protocol (e.g., PDCP/RLC) release.

Figure 4:
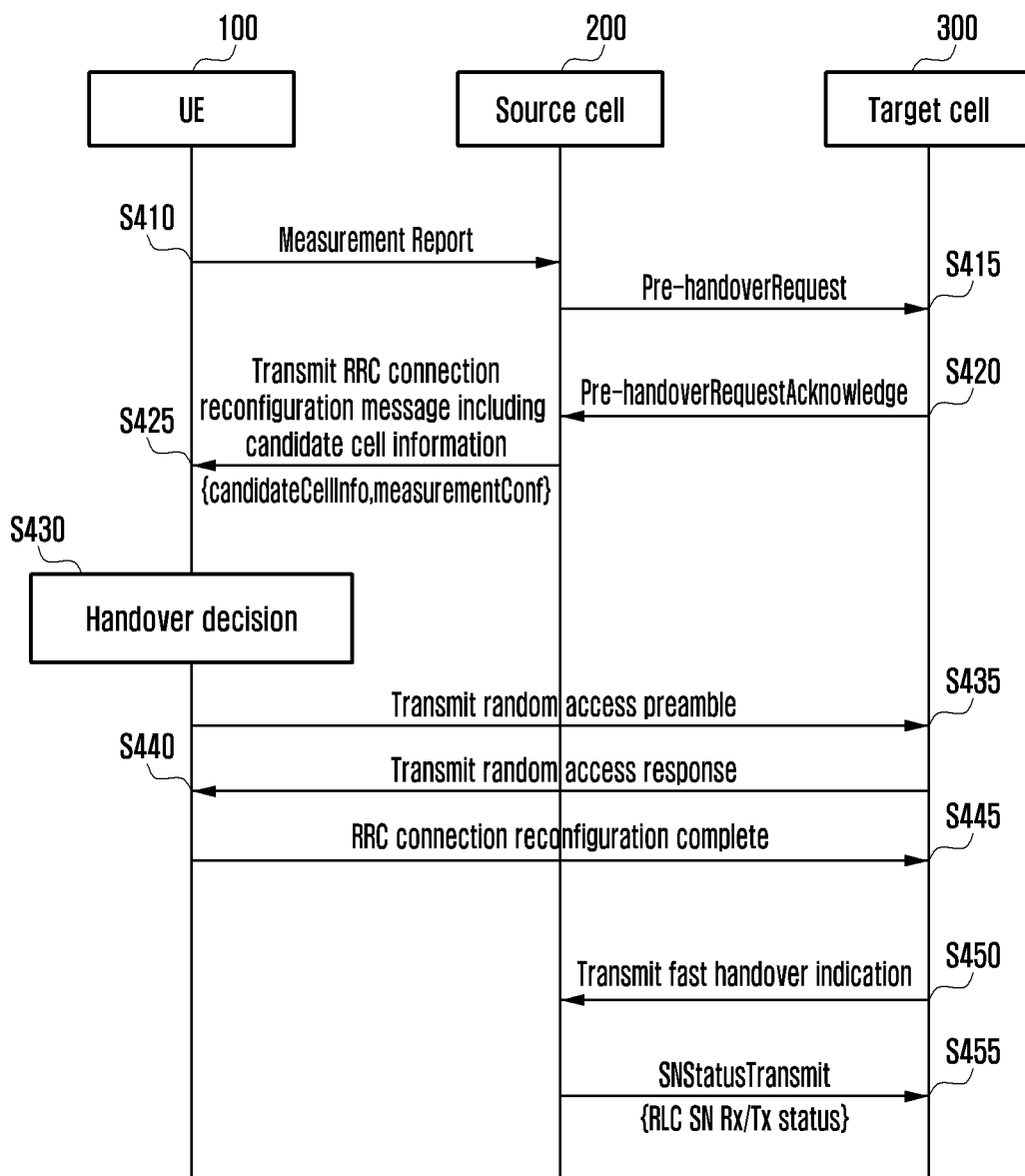
FIG. 4 is a sequence diagram illustrating a UE-based inter-base station handover procedure according to an embodiment of the present disclosure.

Meanwhile, FIG. 4 is a sequence diagram illustrating a UE-based inter-base station handover procedure according to an embodiment of the present disclosure. Unlike FIG. 3, even when the handover between cells of different base stations is performed, the fast HO may be performed according to predetermined conditions. For example, when a service used by the terminal is a service (for example, a streaming service) that needs to transmit and receive data without interruption or when there are many obstacles around the terminal or the handover is frequently repeated at any time, it may be determined that the fast HO condition is satisfied.

First, the source cell 200 receiving the measurement report from the terminal 100 in step S410 may transmit a pre-handover request message to the target cell 300 in step S415. In step S420, the target cell 300 may transmit the acknowledgement to the received pre-handover request message.

Specifically, the source cell 200 may transmit the pre-handover request message including information on the RB of the user plane (e.g., PDCP/RLC) and the security key of the source cell 200. Accordingly, the target cell 300 may use the security key of the source cell 200 when the fast HO is performed by the determination of the terminal 100.

If the target cell 300 receiving the pre-request may accommodate the handover, the target cell 300 may transmit an Ack message for the pre-handover request to the source cell 200 to accept the handover.

In step S425, the source cell 200 may provide, to the terminal 100, candidate cell information that the terminal 100 may be used in the handover determination, through an RRC connection reconfiguration message. For example, the source cell 200 may transmit the candidate cell information including the new terminal ID (for example, identifier (C-RNTI) that the target cell allocates) for the fast HO, the target SI, and the RACH information.

In step S430, the terminal 100 may determine a handover. In detail, when the handover event is triggered and the target cell is determined, the terminal 100 may determine whether it is the fast HO based on the candidate cell information on the determined target cell.

The terminal 100 in which the fast HO is determined by the target cell 300 does not reset the specific user plane protocol (for example, PDCP and RLC) and may also maintain the security key as a key used in the source cell.

In addition, in steps S435 to S445, the random access procedure may be performed and the RRC connection reconfiguration complete message may be transmitted. The detailed process of steps S430 to S445 is as described in FIG. 3.

Accordingly, the target cell 300 may also reuse the RB of the specific user plane protocol (e.g., PDCP/RLC) of the source cell 200 and the security key without resetting the RB of the specific user plane protocol (e.g., PDCP/RLC) and the security key.

Meanwhile, in step S450, the target cell 300 may transmit a fast HO indication to the source cell 200. Specifically, since the target cell 300 is a cell of a base station different from the source cell 200, the target cell 300 may receive the existing RLC RB by transmitting the fast HO indication.

Accordingly, the source cell 200 receiving the fast HO indication may transmit the SNstatus of the RLC to the target cell 300 in step S455. Therefore, the target cell 300 may reuse the existing RLC RB without resetting the RLC RB.

The source cell 200 may forward, to the target cell, the RLC packet having the SN following the SN of the data packet transmitted from the source cell to the terminal according to the SNstatus of the RLC. Hereinafter, specific operations of the terminal and the base station in the UE-based fast HO as described above with reference to FIGS. 5 to 7 will be described.

Figure 5:
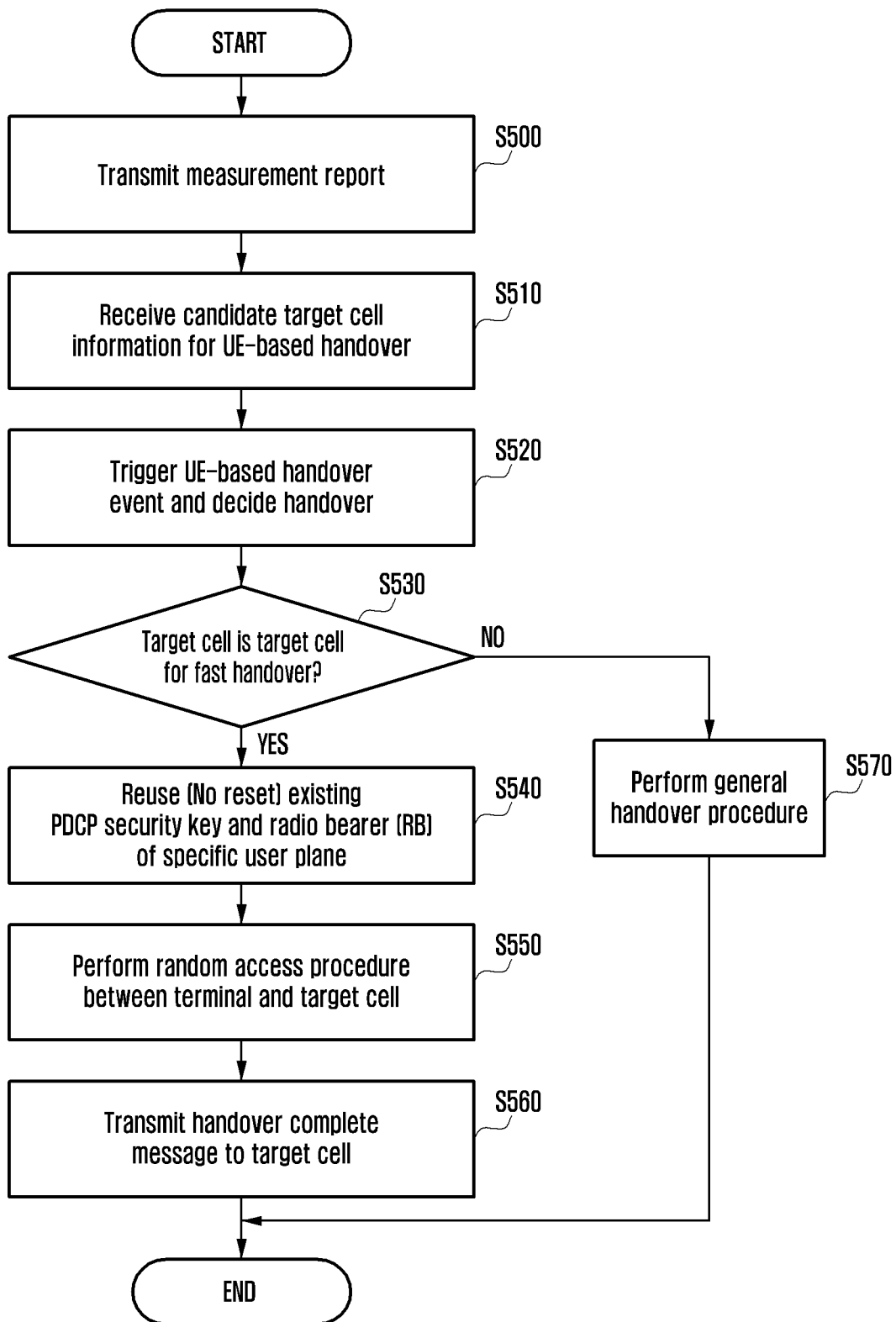
FIG. 5 is a flowchart illustrating a UE-based handover procedure of a terminal according to an embodiment of the present disclosure.

Specifically, FIG. 5 is a flowchart illustrating a UE-based fast HO procedure of a terminal according to an embodiment of the present disclosure. When the terminal performs the UE-based fast HO, it may operate regardless of intra or inter HO.

In step S500, the terminal may transmit the measurement report (MR) to the source cell.

For example, the base station may configure the measurement report to the terminal to select the candidate cell for UE-based handover (hereinafter, referred to as the UE-based HO). Accordingly, the terminal may transmit the measurement report to the source cell.

In step S510, the terminal may receive the candidate target cell information for the UE-based HO. Specifically, the base station may select one or more candidate cells that may be the target cell at the time of UE-based HO based on the MR, and transmits the candidate cell information to the terminal. The attribute information on the candidate cell may include a new terminal identifier (newUE-Identity) including a candidate cell ID, a radio resource configuration command (radioResourceConfigCommon) information, RACH information (rach-ConfigDedicated), and the like.

On the other hand, when the fast HO is not performed, the source cell may transmit the candidate cell information including only the candidate cell identifier to the terminal.

In step S520, the terminal may determine a handover when a UE-based HO event trigger occurs. In step S530, the terminal may determine whether the target cell performing the handover is the fast handover target cell.

For example, if the handover event is triggered and the target cell is selected, the terminal may determine whether there is the fast HO operation based on the candidate cell information on the target cell. For example, the terminal may receive information on candidate cells for the UE-based OH from the base station. The base station may transmit the candidate cell information including information necessary for the fast HO to the terminal when there is a cell necessary for the fast HO among the candidate cells (for example, when it is determined that other cells in the base station among the candidate cells are required to be the fast HO, when the service used by the terminal is the streaming service required to transmit and receive data without interruption, or when the occurrence of the handover for the specific terminal or the specific cell, the occurrence of the failure of the handover or the radio link failure (RLF) is frequent).

At this time, the base station may transmit new UE-Identity, radioResourceConfigCommon, rach-ConfigDedicated, and ReuseProtocolType information as information required for the fast HO. In addition, as described above, the base station may transmit only the information necessary for the fast HO or non-explicitly inform the terminal of the target cell performing the fast HO, while the base station may explicitly transmit the fast HO indication to the terminal.

Accordingly, the terminal may perform the fast HO when the handover event is triggered and the candidate cell information including the additional information for the fast HO is included in the target cell performing the handover.

If the performance of the fast HO is determined, in step S540, the terminal may reuse (no reset) the existing PDCP security key and the radio bearer (RB) of the specific user plane protocol (for example, PDCP/RLC).

Specifically, the terminal performing the fast HO does not reset the RB of the specific user plane protocol (for example, PDCP/RLC), and also maintains the security key as the security key used in the source cell.

In step S550, the terminal may perform the random access procedure with the target cell. Specifically, the terminal may perform a dedicated random access or a contention-based random access according to whether the rach-ConfigDedicated is configured in the received candidate cell information.

When the random access procedure is normally completed, the handover complete message including the C-RNTI information on the candidate cell may be transmitted to the target base station. For example, the terminal may transmit an RRC reconfiguration complete message to the target base station.

On the other hand, in step S530, if the target cell is not the target cell of the fast HO target, the terminal proceeds to step S570 and may perform a general handover procedure. The general handover procedure is as described above with reference to FIGS. 1 and 2.

Figure 6:
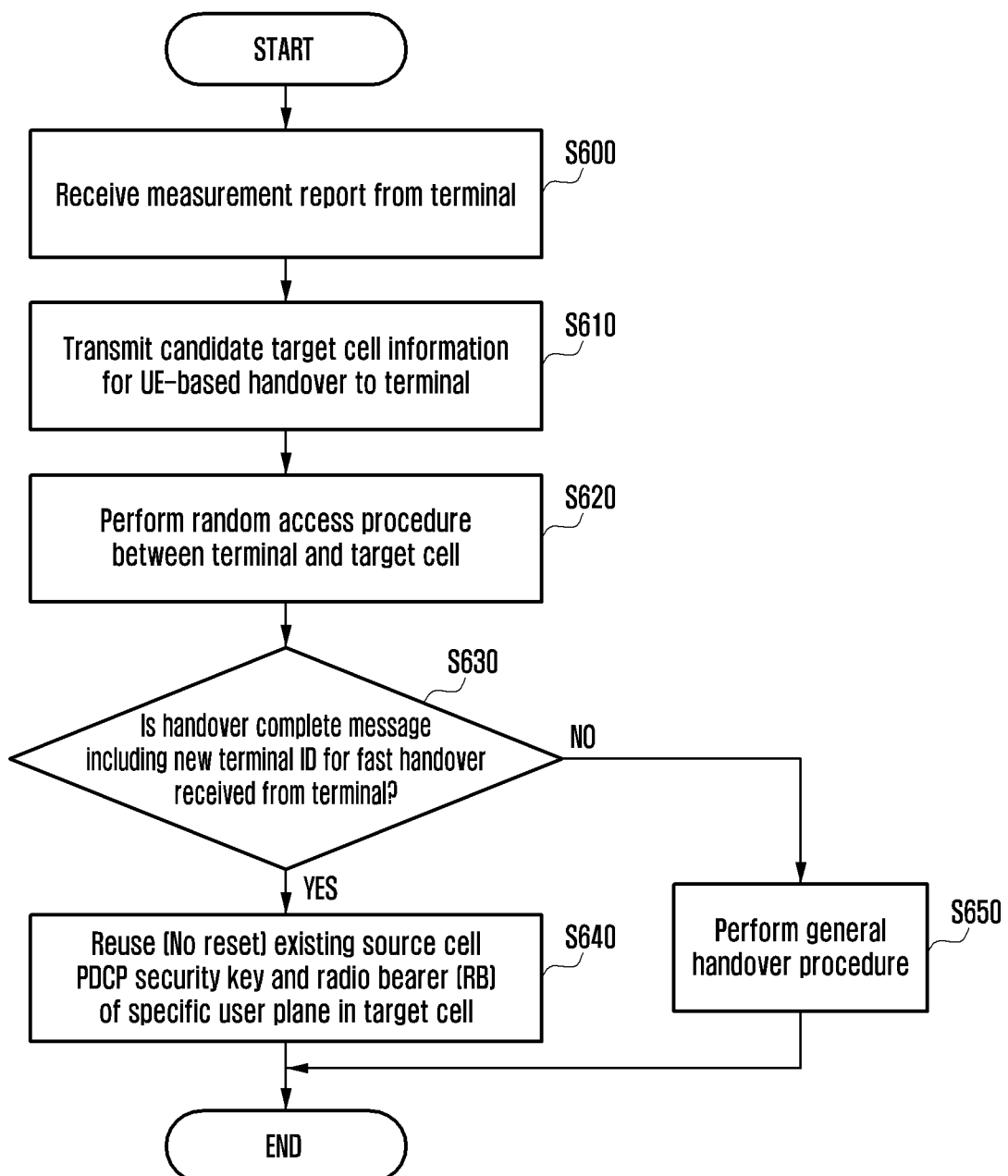
FIG. 6 is a flowchart illustrating an inter-cell handover procedure in a UE-based base station of a source cell according to an embodiment of the present disclosure.

FIG. 6 is a flowchart illustrating an inter-cell handover procedure in a UE-based base station of a source cell according to an embodiment of the present disclosure.

First, in step S600, the source cell may receive a measurement report from a terminal for selecting a candidate target cell.

For example, if the source cell determined that the UE-based HO is required, the source cell may transmit a measurement setting value to the terminal for selecting a candidate cell. The source cell receives the measurement report from the terminal according to the set value.

In step S610, the source cell may transmit to the terminal the candidate target cell information for the UE-based HO.

For example, the source cell transmits to the terminal the information on the candidate cell that may be a target cell at the time of the UE-based HO based on the measurement report information. The corresponding candidate cell information may include information for allowing the UE to recognize whether the fast HO is required for each candidate cell as described above with reference to Table 1.

In step S620, the terminal may perform the random access procedure with the target cell. Specifically, if the handover event is triggered in the terminal and one of the candidate cells in the base station is selected as the target cell, the terminal may perform a random access procedure with the target cell.

In step S630, the target cell may determine whether a handover complete message including a new terminal identifier for a fast handover is received from the terminal. If the handover complete message including the new terminal ID is received, in step S640, the target cell may reuse a security key of the existing source cell and a radio bearer (RB) of a specific user plane protocol (for example, PDCP/RLC).

For example, if the fast HO is determined by the terminal based on the candidate cell information, the terminal may receive the handover complete message including the new terminal identifier for the fast HO to the target cell.

If the handover complete message including the new terminal identifier is received, the target cell may recognize that the terminal is performing a handover through the fast HO. Therefore, the target cell may reuse the security key of the existing source cell and the RB of the specific user plane protocol (for example, PDCP/RLC) without resetting the security key of the existing source cell and the RB of the specific user plane protocol.

On the other hand, in step S630, if the target cell does not receive the handover complete message including the new terminal identifier, for example, when the target cell receives the RRC connection reestablishment request message, the process proceeds to step S650, a general handover procedure is performed.

Figure 7:
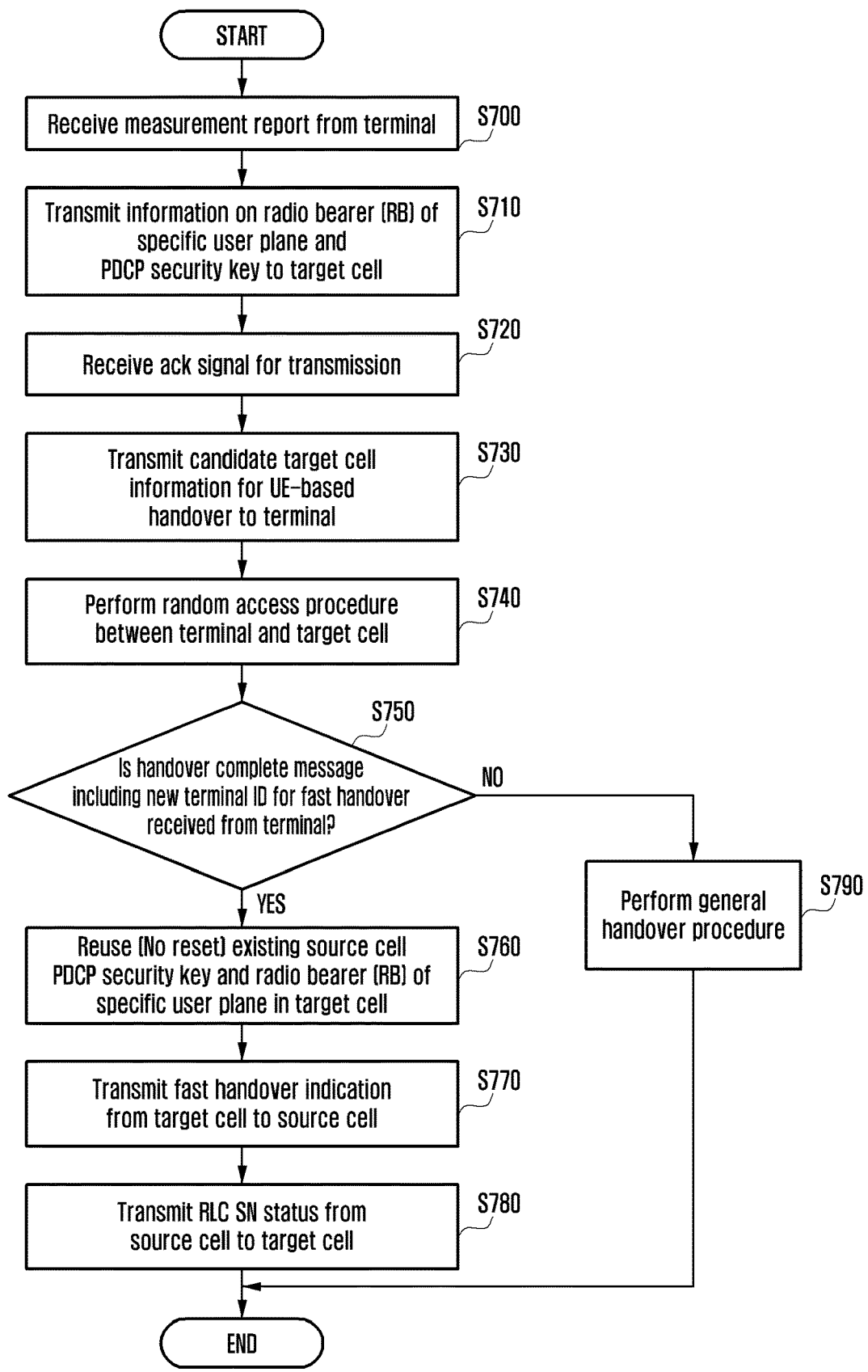
FIG. 7 is a flowchart illustrating a UE-based inter-base station handover procedure of a base station according to an embodiment of the present disclosure.

Meanwhile, FIG. 7 is a flowchart illustrating a UE-based inter-base station handover (UE-based inter-HO) procedure of the base station according to an embodiment of the present disclosure. For example, the source cell may be a cell of a source base station, and the target cell may be a cell of a target base station that is different from the source base station.

First, in step S700, the source cell may receive a measurement report from a terminal for selecting a candidate target cell.

For example, if the source cell is determined that the UE-based HO is required, the source cell may transmit a measurement setting value to the terminal for selecting a candidate cell. The source cell receives the measurement report from the terminal according to the set value.

In step S710, the source cell may transmit the information on the radio bearer (RB) of the specific user plane protocol (for example, PDCP/RLC) and the security key to the target cell. For example, the target cell may reuse the information on the RB of the received specific user plane (for example, PDCP/RLC) and the security key when the connection with the UE is completed.

When the ack signal for the transmission is received from the target cell in step S720, the source cell may transmit the candidate target cell information for the UE-based handover to the terminal in step S730.

The terminal receiving the information on the target cell for the fast HO may perform the fast HO to the target cell by the source cell. Accordingly, the terminal may reuse the RB of the specific user plane protocol (for example, PDCP/RLC) and the security key.

Meanwhile, in step S740, the terminal and the target cell of the target base station may perform the random access procedure. In step S750, the target cell may determine whether the handover complete message including the new terminal identifier for the fast handover is received from the terminal.

For example, if the fast HO is performed, the terminal may transmit the handover complete message including the new terminal identifier. Therefore, the target cell may determine whether to perform the fast HO based on whether the handover complete message including the new terminal ID is received.

Therefore, in step S760, the target cell may reuse the security key of the existing source cell and the RB of the specific user plane protocol (for example, PDCP/RLC).

In step S770, the target cell may transmit the fast HO indication to the source cell. Specifically, since the target cell 300 is a cell of a base station different from the source cell 200, the target cell 300 may receive the existing RLC RB by transmitting the fast HO indication.

Accordingly, in step S780, the source cell 200 receiving the fast HO indication may transmit the SNstatus of the RLC to the target cell 300. Therefore, the target cell 300 may reuse the existing RLC RB without resetting the RLC RB.

Meanwhile, if the handover completion message including the new terminal ID for the fast HO is not received from the terminal in step S750, the target cell may perform the general handover procedure with the terminal (step S790).

Hereinafter, a procedure for performing the network-based (NW-based) handover will be described in detail.

Figure 8:
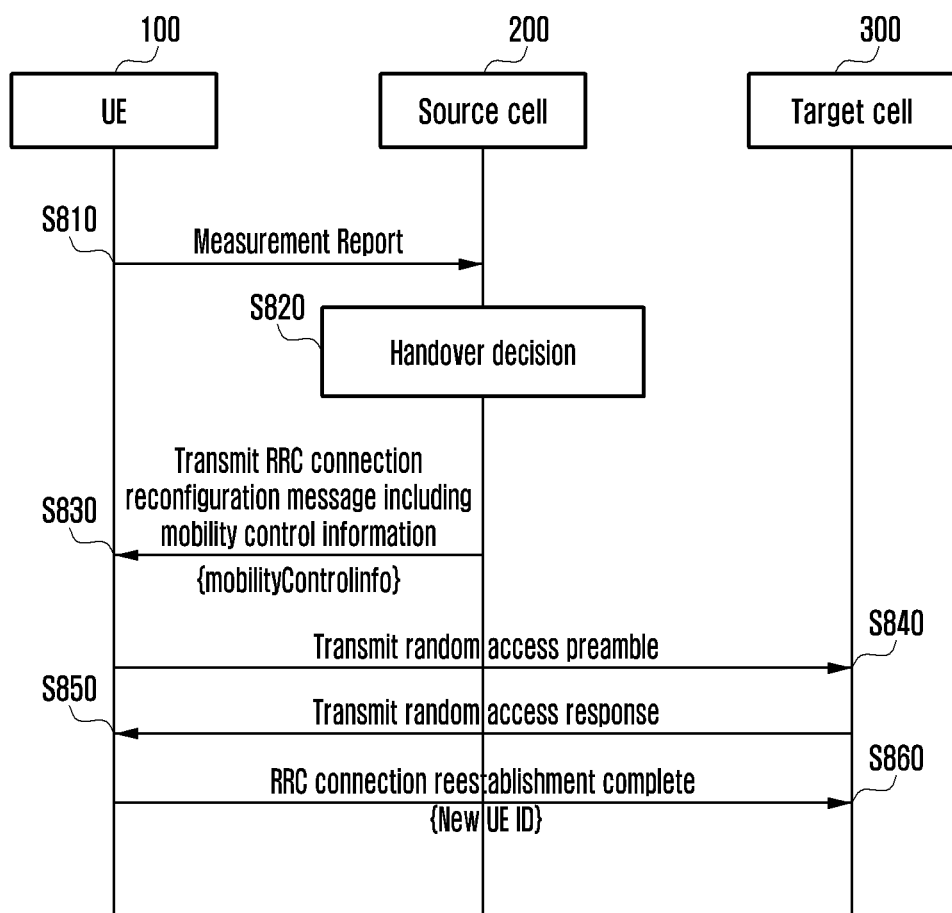
FIG. 8 is a sequence diagram illustrating an inter-cell handover procedure in a network-based base station according to an embodiment of the present disclosure.

FIG. 8 is a sequence diagram illustrating an NW-based intra HO procedure according to an embodiment of the present disclosure. Therefore, the source cell 200 and the target cell 300 of FIG. 8 may be a cell of the same base station.

First, in step S810, the terminal 100 may transmit a measurement report to the source cell 200. For example, the terminal 100 connected to the source cell 200 and performing communication may periodically measure a signal level and report the measured signal level to the source cell 200.

Specifically, the terminal 100 may be set for a predetermined condition or a reporting period for the measurement report. According to the setup, the terminal 100 may perform the measurement report when satisfying the predetermined condition, or according to a predetermined reporting period.

In step S820, the source cell 200 receiving the measurement report may determine the handover. In the NW-based HO, unlike the UE-based HO, a subject determining the handover may be the source cell.

In detail, the source cell 200 may determine the target cell performing the handover based on the measurement report that the terminal 100 transmits. The source cell 200 may determine that the target cell 300 should perform the fast HO. At this time, the source cell 200 may not perform the RB reset of the specific user plane protocol (for example, PDCP/RLC) and the security key update. For example, if the source cell 200 is a cell within the same base station as the target cell, it may determine to perform the fast HO.

If the handover is determined, in step S830, the source cell 200 may transmit the RRC connection reconfiguration message including the mobility control information to the terminal 100. At this time, the source cell 200 may transmit the information on the target cell 300 to be handed over to the terminal 100. As described above, when the source cell 200 determines the fast HO with the target cell 300, the source cell 200 may transmit the fast HO indication information for the target cell 300.

Therefore, the terminal 100 receiving the RRC connection reconfiguration message performs the fast HO, and thus can reuse the RB of the specific user plane protocol (for example, PDCP/RLC) and the security key without resetting the RB of the specific user plane protocol and the security key. For example, the terminal 100 may use the security key with the target cell 300 as it is without updating the security key used with the source cell 200.

In step S840, the terminal 100 may transmit the random access preamble to the target cell 300. As a response to the random access preamble, the terminal 100 may receive a random access response message from the target cell 300 in step S850.

In addition, in step S860, the terminal 100 may transmit the RRC connection reconfiguration complete message to the target cell 300 to complete the connection with the target cell 300. At this time, the terminal 100 may transmit the RRC connection reconfiguration complete message including the new terminal identifier.

Therefore, the target cell 300 receiving the new terminal identifier may reuse the security key of the existing source cell and the RB of the specific user plane protocol (for example, PDCP/RLC).

Figure 9:
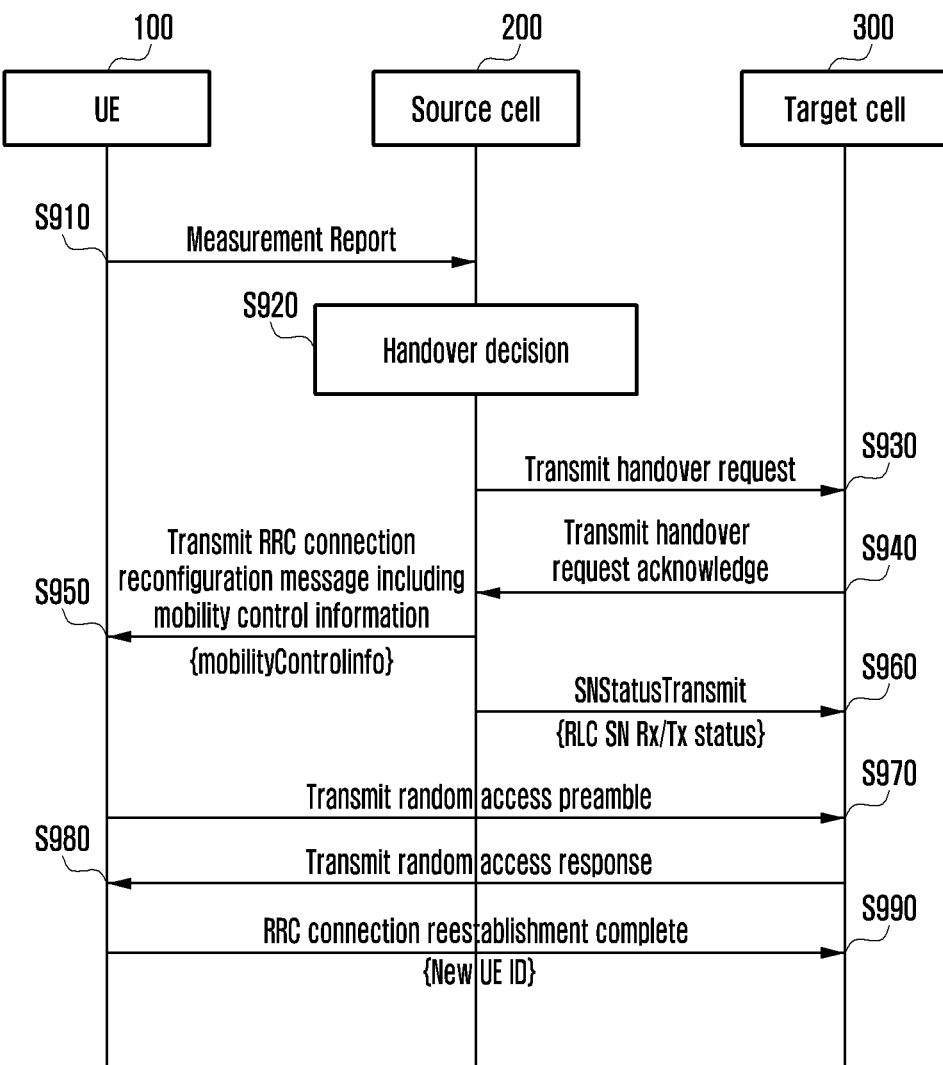
FIG. 9 is a sequence diagram illustrating a network-based inter-base station handover procedure according to an embodiment of the present disclosure.

Meanwhile, FIG. 9 is a sequence diagram illustrating an NW-based inter HO procedure according to an embodiment of the present disclosure.

First, in step S910, the terminal 100 may transmit the measurement report to the source cell 200. For example, the terminal 100 connected to the source cell 200 and performing communication may periodically measure the signal level and report the measured signal level to the source cell 200.

In step S920, the source cell 200 receiving the measurement report may determine the handover. For example, the source cell 200 may determine the target cell and determine whether to perform the fast HO. If the target cell to be handed over satisfies a predetermined condition, the source cell 200 may determine to perform the fast HO.

If the fast HO is determined, in step S930, the source cell 200 may transmit the handover request to the target cell 300 to be handed over. At this time, the source cell 200 may transmit the information on the RB of the specific user plane protocol (for example, PDCP/RLC) and the security key to the target cell 300.

In step S940, the target cell 300 which determines that the handover is acceptable may transmit a handover request response to the source cell 200.

In step S950, the source cell 200 receiving the ack response may transmit an RRC connection reconfiguration message including mobility control information to the terminal 100. At this time, the source cell 200 may transmit the information on the target cell 300 to be handed over to the terminal 100. For example, the source cell 200 may transmit the fast HO indication information for the target cell to the terminal 100.

Therefore, the terminal 100 receiving the RRC connection reconfiguration message may reuse the RB of the specific user plane protocol (for example, PDCP/RLC) and the security key.

Meanwhile, in step S960, the source cell 200 may transmit the SNstatus to the target cell 300. Specifically, the source cell 200 may transmit a sequence number of a packet of a RLC layer to the target cell 300 through an interface between the base stations, and inform from which packet is to be transmitted and received to the terminal 100 after the handover is completed. The source cell 200 may forward, to the target cell, the data packet having the SN following the SN of the data packet transmitted from the source cell to the terminal according to the SNstatus of the RLC.

The terminal 100 and the target cell 300 may perform the random access procedure. Specifically, in step S970, the terminal 100 may transmit the random access preamble to the target cell 300. As the response to the random access preamble, the terminal 100 may receive a random access response message from the target cell 300 in step S980.

In addition, in step S990, the terminal 100 may transmit the RRC connection reconfiguration complete message to the target cell 300 to complete the connection with the target cell 300. At this time, the terminal 100 may transmit the RRC connection reconfiguration complete message including the new terminal identifier.

Therefore, the target cell 300 receiving the new terminal identifier may reuse the security key of the existing source cell and the RB of the specific user plane protocol (for example, PDCP/RLC).

Hereinafter, specific operations of the terminal and the base station in the NW-based fast HO as described above with reference to FIGS. 10 to 12 will be described.

Figure 10:
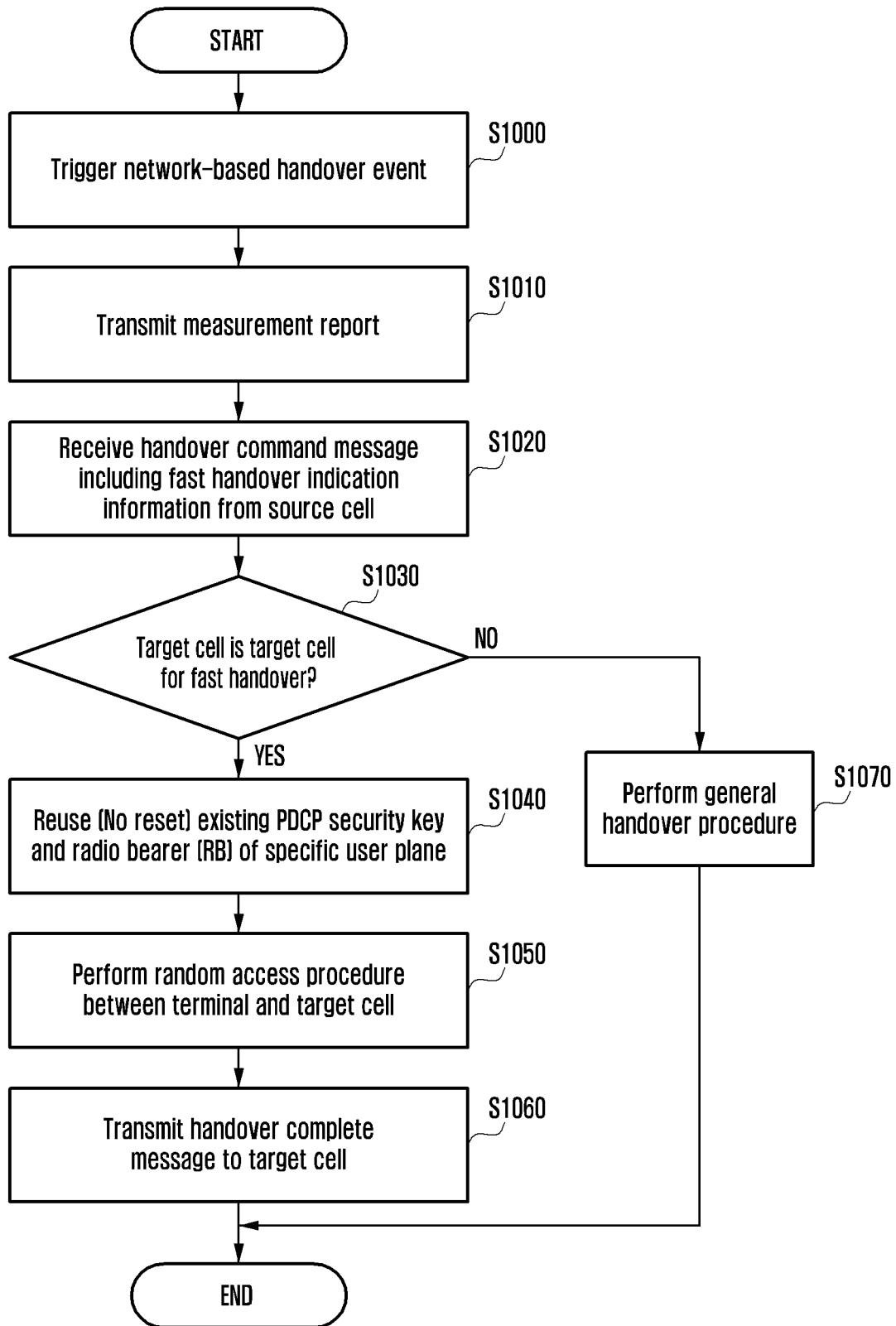
FIG. 10 is a flowchart illustrating a network-based handover procedure of a terminal according to an embodiment of the present disclosure.

Specifically, FIG. 10 is a flowchart illustrating the NW-based fast HO procedure of a terminal according to an embodiment of the present disclosure. When the terminal performs the NW-based fast HO, it may operate regardless of intra or inter HO.

First, in step S1000, when the network-based handover event is triggered, in step S1010, the terminal may transmit the measurement report to the source cell. In step S1020, the handover command message including the fast handover indication information may be received from the source cell.

Specifically, the terminal transmits the measurement report to the source cell due to the trigger of the HO event. The source cell may transmit the HO command including the information on whether to perform the target cell and the fast HO to the terminal.

In step S1030, the terminal may determine whether the target cell is the fast HO target cell. For example, if the terminal receives the information required for the fast HO through the target cell information, the terminal may determine that the target cell is the fast HO target cell. According to an embodiment of the present disclosure, when the intra-cell HO in one base station is performed, the source cell may be determined to satisfy the fast HO condition. Accordingly, the terminal receiving the target cell information including information necessary for the fast HO in the intra-HO may perform the fast HO on the target cell.

On the other hand, if the target cell is the fast HO target cell, in step S1040, the terminal does not reset the RB of the specific user plane protocol (for example, PDCP/RLC), and may also keep the security key as the key used in the source cell.

In step S1050, the terminal may perform the random access procedure with the target cell.

When the handover procedure is completed, in step S1060, the terminal may transmit the HO complete message (for example, RRC reconfiguration complete message) including the new terminal identifier to the target cell.

In step S1030, if the target cell is not the fast HO, the terminal proceeds to step S1070 and may perform the general handover procedure.

Figure 11:
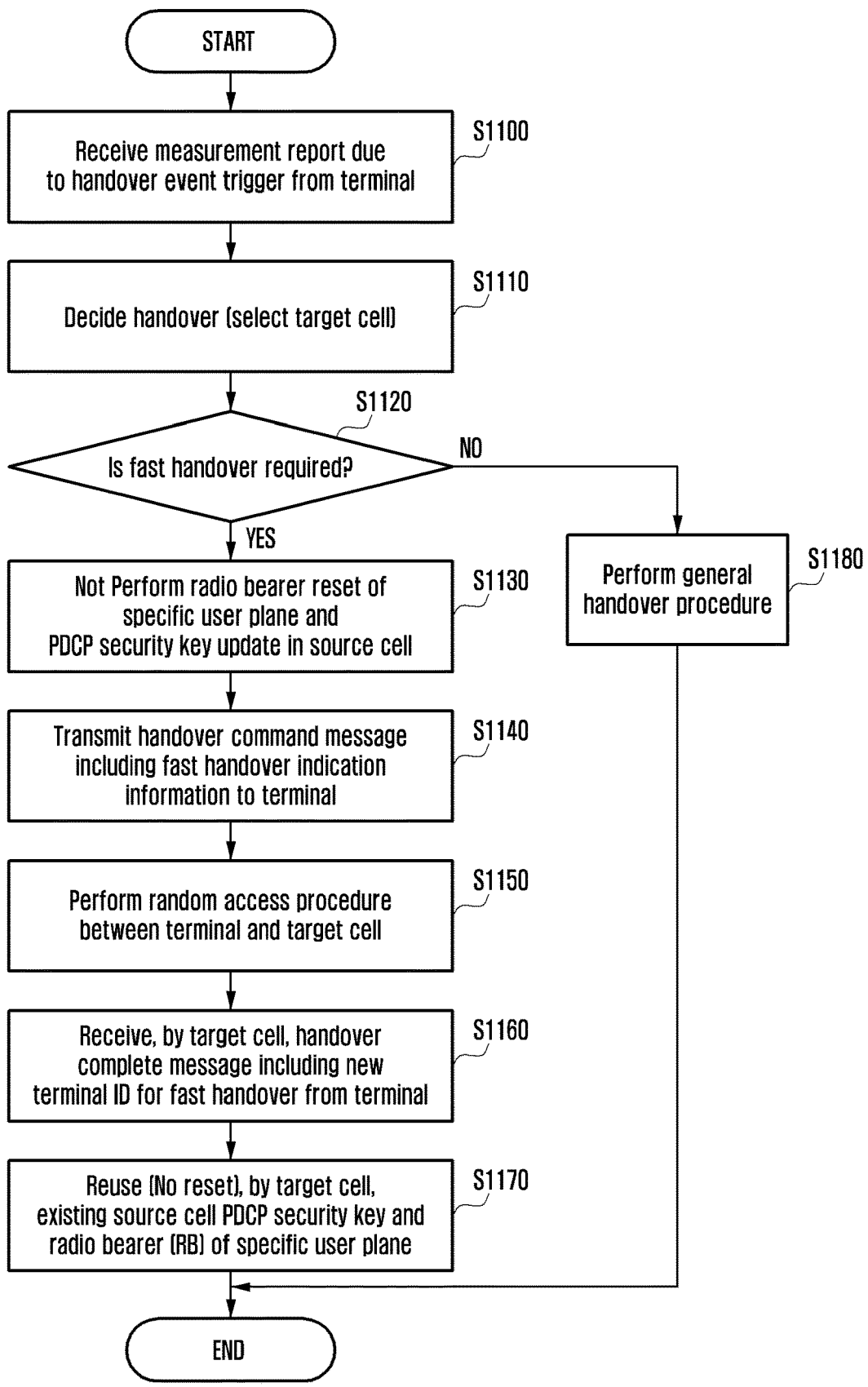
FIG. 11 is a flowchart illustrating an inter-cell handover procedure in a network-based base station of a base station according to an embodiment of the present disclosure.

Meanwhile, FIG. 11 is a flowchart illustrating the NW-based intra-HO procedure of the base station according to an embodiment of the present disclosure.

First, in step S1100, the source cell may receive the measurement report due to the handover event trigger from the terminal. In step S1200, the source cell may determine the handover. Specifically, the source cell may determine the target cell which performs the handover based on the received measurement report.

In step S1120, the source cell may determine whether the fast HO is required for the determined target cell. For example, if a service used by a terminal performing communication is a service such as streaming which needs to transmit and receive data seamlessly, the source cell may determine that the fast HO is required. Alternatively, if the terminal determines that the handover is repeated frequently for a certain time, the source cell may determine that the fast HO is required for the terminal.

As the determination result, if the fast HO is required for the determined target cell, in step S1130, the source cell may not perform the RB reset of the specific user plane protocol (for example, PDCP/RLC) and the update of the security key.

Therefore, in step S1140, the source cell may transmit to the HO command message including the fast HO indication information to the terminal.

In step S1150, the random access procedure between the terminal and the target cell may be performed.

When the handover procedure is completed, in step S1160, the target cell may receive the HO complete message (for example, RRC reconfiguration complete message) including the new terminal identifier from the terminal.

Therefore, in step S1170, the target cell may reuse the security key of the existing source cell and the radio bearer (RB) of the specific user plane protocol (for example, PDCP/RLC). For example, when the terminal performs the fast HO through the new terminal identifier, the target cell does not reset the security key and the radio bearer of the specific user plane protocol (for example, PDCP/RLC).

On the other hand, in step S1120, if the fast HO is not required, the process proceeds to step S1180, and thus terminal and the target base station may perform the general handover procedure.

Figure 12:
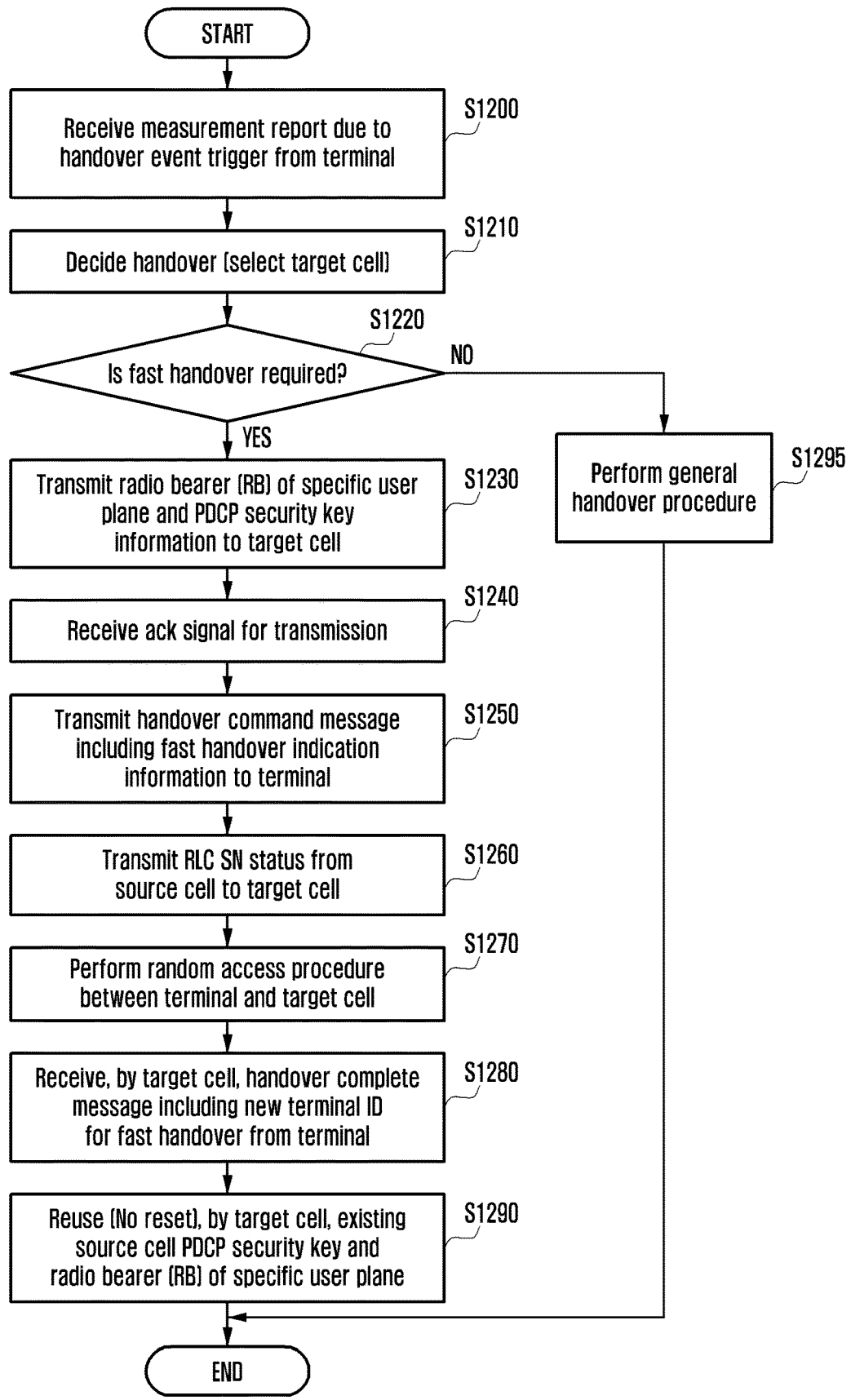
FIG. 12 is a flowchart illustrating a network-based inter-base station handover procedure of a base station according to an embodiment of the present disclosure.

FIG. 12 is a flowchart illustrating the NW-based inter-HO procedure of the base station according to an embodiment of the present disclosure. The NW-based inter-HO procedure shown in FIG. 12 is similar to the NW-based intra-HO procedure shown in FIG. 11 as described above. However, since the source cell and the target cell are cells of different base stations in FIG. 12, there may be added operations.

First, in step S1200, the source cell may receive the measurement report due to the handover event trigger from the terminal. In step S1210, the source cell may determine the handover. Specifically, the source cell may determine the target cell which performs the handover based on the received measurement report.

In step S1220, the source cell may determine whether the fast HO is required for the determined target cell.

As the determination result, if the fast HO is required for the determined target cell, in step S1230, the source cell may transmit the information on the RB of the specific user plane protocol (for example, PDCP/RLC) and the security key to the target cell of the target base station.

The target cell receiving the information on the RB of the specific user plane protocol (for example, PDCP/RLC) and the security key may transmit the ack signal to the source cell (step S1240).

Therefore, in step S1250, the source cell may transmit to the HO command message including the fast HO indication information to the terminal Accordingly, when the terminal performs the handover to the target cell that needs to perform the fast HO, it may reuse the RB of the specific User Plane Protocol (for example, PDCP/RLC) and the security key.

Meanwhile, in step S1260, the source cell may transmit a sequence number status (SN status) of the RLC to the target cell. Specifically, the source cell may transmit a sequence number of a packet of a RLC layer to the target cell through an interface between the base stations, and inform from which packet is to be transmitted and received to the terminal 100 after the handover is completed.

In step S1270, the random access procedure between the terminal and the target cell may be performed.

When the HO procedure is completed, in step S1280, the target cell may receive the HO complete message (for example, RRC reconfiguration complete message) including the new terminal identifier from the terminal.

Therefore, in step S1290, the target cell may reuse the security key of the existing source cell and the radio bearer (RB) of the specific user plane protocol (for example, PDCP/RLC). For example, when the terminal performs the fast HO through the new terminal identifier, the target cell does not reset the security key and the radio bearer of the specific user plane protocol (for example, PDCP/RLC).

On the other hand, in step S1220, if the fast HO is not required, the process proceeds to step S1295, and thus terminal and the target base station may perform the general handover procedure.

The handover method as described above eliminates the dependency of the cell in the ciphering and RRC reset operations and eliminates the transmission/reception of unnecessary RRC messages to be able to improve performance in terms of the mobility of the terminal and processing in the cloud RAN (centralization & virtualization) environment.

Figure 13:
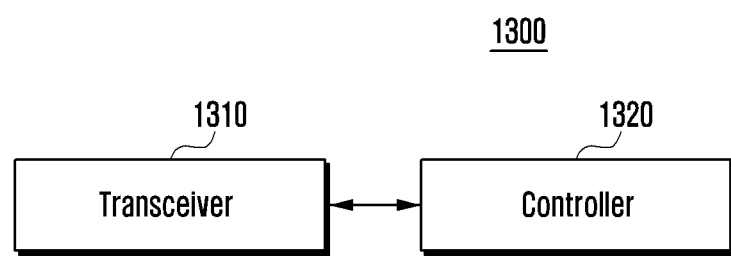
FIG. 13 is a block diagram illustrating a configuration of a terminal according to an embodiment of the present disclosure.

FIG. 13 is a block diagram illustrating a configuration of a terminal 1300 according to an embodiment of the present disclosure. The terminal 1300 may include a transceiver 1310 and a controller 1320.

The transceiver 1310 is a component for transmitting and receiving a signal.

The controller 1320 is a component for controlling the terminal 1300 as a whole. Specifically, the controller 1320 may control the transceiver 1310 to receive a message including the information on one or more target cell for performing the fast handover from the source cell.

The controller 1320 may control to perform the fast handover by reusing the radio bearer based on the received information.

In addition, the controller 1320 may perform the fast handover by reusing the security key corresponding to the source cell and the radio bearer of the specific user plane protocol (for example, PDCP/RLC).

When the fast handover procedure is completed, the controller 1320 may control the transceiver 1310 to transmit the handover complete message including the new terminal identifier to the target cell. The security key corresponding to the source cell and the radio bearer of the specific user plane protocol (for example, PDCP/RLC) are reused by the target cell that has received the handover complete message including the new terminal identifier.

On the other hand, the controller 1320 may control not only the above contents, but also the operations of the terminal 1300 in all of the above embodiments.

Figure 14:
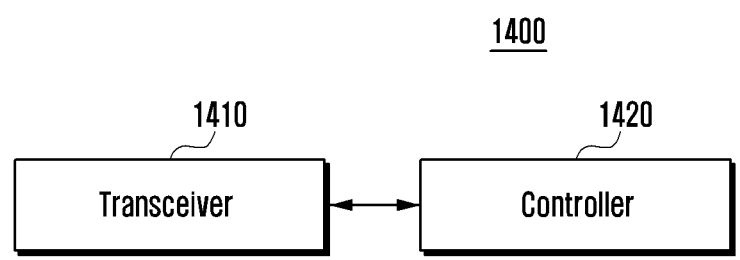
FIG. 14 is a block diagram illustrating a configuration of a base station according to an embodiment of the present disclosure.

FIG. 14 is a block diagram illustrating a configuration of a base station 1400 according to an embodiment of the present disclosure. The base station 1400 may include a transceiver 1410 and a controller 1420.

The transceiver 1410 is a component for transmitting and receiving a signal.

The controller 1420 is a component for controlling the base station 1400 as a whole.

First, the base station 1400 may perform the fast HO of the source cell and the intra-target cell in the cell. At this time, the controller 1420 may control the operation of each cell by being included in each of the source cell and the target cell. However, this is only an example, and the controller 1420 may be included in the base station 1400 to control the operations of the source cell and the target cell.

First, when the controller 1420 is a controller of the source cell or the base station 1400, the controller 1420 controls the transceiver 1410 to receive the measurement report including the measurement result of one or more cell from the terminal. The controller 1420 may determine one or more target cell capable of performing the fast handover in which the radio bearer is reused, based on the measurement report.

For example, the controller 1420 may determine another cell in the base station 1400 as the target cell performing the fast HO based on the measurement report.

In addition, the controller 1420 may control the transceiver to transmit the information on the one or more target cell determined to the terminal.

Meanwhile, at the time of performing the fast handover, the security key corresponding to the source cell and the radio bearer of the specific user plane protocol (e.g., PDCP/RLC) may be reused by the terminal and the target cell.

In addition, when the controller 1420 is the controller of the base station 1400, in the one or more target cell, the controller 1420 may control the security key and the RB reset of the specific user plane protocol (for example, PDCP/RLC) to be skipped when the target cell which performs the fast handover with the terminal is the cell of the base station such as the source cell. Such an operation may also be performed by the controller of the target cell when the controller of the target cell exists separately.

Meanwhile, if the target cell in which the fast handover is performed is the cell of the base station different from the source cell and the controller 1420 is the controller of the source cell, the controller 1420 may control the transceiver 1410 to transmit the information on the security key and the radio bearer of the specific user plane protocol (for example, PDCP/RLC) to the target cell.

In the one or more target cell, when the target cell performing the fast handover with the terminal is the cell of the base station different from the source cell, the controller 1420 may control the transceiver 1410 to transmit the sequence number status of the RLC to the target cell when it is the controller of the source cell.

On the other hand, when the controller 1420 is the controller of the target cell, the controller 1420 may control the transceiver 1410 to receive the handover message including the new terminal identifier from the terminal when the fast handover is completed and to reuse the security key corresponding to the source cell and the radio bearer of the packet data convergence protocol (PDCP) and the radio link control (RLC) based on the new terminal identifier of the received message.

In addition, when the target cell is the cell of the base station different from the source cell, the controller 1420 may control the transceiver 1410 to receive the information on the security key and the radio bearer of the PDCP/RLC and reuse the security key corresponding to the source cell and the radio bearer of the PDCP/RLC based on the received information.

When the target cell is the cell of the base station different from the source cell, the controller 1420 may control the transceiver 1410 to receive the sequence number status of the RLC from the source cell.

When the source cell and the target cell are cells of different base stations, such operations may be performed by each of the controllers of the cells.

On the other hand, the controller 1420 may control not only the above contents, but also the operations of the base station 1400 in all of the above embodiments.

The components of the terminal and the base station described above may be implemented by software. For example, the controller of the terminal and the base station may further include a flash memory or other nonvolatile memories. In the nonvolatile memory, a program for performing each role of the controller may be stored.

Further, the controller of the terminal and the base station may be implemented in a form including a CPU (not illustrated) and a random access memory (RAM). The CPU of the controller may copy the above-described programs stored in the nonvolatile memory into the RAM, and then perform the copied programs to perform the functions of the terminal as described above.

The controller is a component serving to control the terminal and the base station. The controller may be used in the same meaning as a central processing unit, a microprocessor, a processor, an operating system, or the like. Further, the controller of the terminal and the base station may be implemented as a system-on-a-chip or a system on chip (SOC or SoC) along with other function sections such as the communication module included in the terminal.

Meanwhile, the method of the terminal and the base station according to various exemplary embodiments of the present disclosure as described above may be stored in a non-transitory computer readable medium while being coded in software. The non-transitory computer readable medium may be used while being equipped in various apparatuses.

The non-transitory computer readable medium is not a medium that stores data therein for a while, such as a register, a cache, a memory, or the like, but means a medium that semi-permanently stores data therein and is readable by a device. In detail, the non-transitory computer readable medium may be a CD, a DVD, a hard disc, a Blueray disc, an USB, a memory card, an ROM, etc.

Although the exemplary embodiments of the present disclosure have been illustrated and described hereinabove, the present disclosure is not limited to the above-mentioned specific exemplary embodiments, but may be variously modified by those skilled in the art to which the present disclosure pertains without departing from the scope and spirit of the present disclosure as disclosed in the accompanying claims. These modifications should also be understood to fall within the scope of the present disclosure.

The invention claimed is:

1. A terminal for performing a handover in a wireless communication system, the terminal comprising:
   a transceiver configured to transmit and receive a signal; and
   a controller coupled with the transceiver and configured to:
      receive, from a source base station, a first message for a radio resource control (RRC) reconfiguration, wherein the first message includes first information related to a handover from the source base station to a target base station and second information indicating whether to change a security key that has been used with the source base station,
      perform a random access procedure with the target base station based on the first information, and
      transmit, to the target base station, a second message for an RRC reconfiguration complete,
   wherein the security key is used with the target base station after the handover, in case that the second information indicates not to change the security key, and
   wherein central unit-access unit (CU-AU) split is applied to the source base station and the target base station, and the source base station and the target base station are connected to a same CU.

2. The terminal of claim 1, wherein the security key is used for a ciphering and a deciphering of a data associated with the target base station.

3. The terminal of claim 1,
   wherein the handover is performed without a change of a user plane protocol for the terminal by reusing the user plane protocol, and
   wherein the user plane protocol includes a packet data convergence protocol (PDCP).

4. A source base station for performing a handover in a wireless communication system, the source base station comprising:
   a transceiver configured to transmit and receive a signal; and
   a controller coupled with the transceiver and configured to:
      receive first information related to a handover from the source base station to a target base station and second information indicating whether to change a security key that has been used with the source base station, and
      transmit, to a terminal, a first message for a radio resource control (RRC) reconfiguration, the first message including the first information and the second information,
   wherein a random access procedure is performed with the target base station based on the first information,
   wherein a second message for an RRC reconfiguration complete is transmitted to the target base station,
   wherein the security key is used with the target base station after the handover, in case that the second information indicates not to change the security key, and
   wherein central unit-access unit (CU-AU) split is applied to the source base station and the target base station, and the source base station and the target base station are connected to a same CU.

5. The source base station of claim 4, wherein the security key is used for a ciphering and a deciphering of a data associated with the target base station.

6. The source base station of claim 4,
   wherein the handover is performed without a change of a user plane protocol for the terminal by reusing the user plane protocol, and
   wherein the user plane protocol includes a packet data convergence protocol (PDCP).

7. A target base station for performing a handover in a wireless communication system, the target base station comprising:
   a transceiver configured to transmit and receive a signal; and
   a controller coupled with the transceiver and configured to:
      perform a random access procedure with a terminal based on first information related to a handover from a source base station to the target base station, and
      receive, from the terminal, a first message for a radio resource control (RRC) reconfiguration complete,
   wherein a second message for an RRC reconfiguration is transmitted to the terminal from the source base station, the second message including the first information and second information indicating whether to change a security key that has been used with the source base station,
   wherein the security key is used with the target base station after the handover, in case that the second information indicates not to change the security key, and
   wherein central unit-access unit (CU-AU) split is applied to the source base station and the target base station, and the source base station and the target base station are connected to a same CU.

8. The target base station of claim 7, wherein the security key is used for a ciphering and a deciphering of a data associated with the target base station.

9. The target base station of claim 7,
wherein the handover is performed without a change of a user plane protocol for the terminal by reusing the user plane protocol, and
wherein the user plane protocol includes a packet data convergence protocol (PDCP).

10. A method for performing a handover by a terminal in a wireless communication system, the method comprising:
receiving, from a source base station, a first message for a radio resource control (RRC) reconfiguration, wherein the first message includes first information related to a handover from the source base station to a target base station and second information indicating whether to change a security key that has been used with the source base station;
performing a random access procedure with the target base station based on the first information; and
transmitting, to the target base station, a second message for an RRC reconfiguration complete,
wherein the security key is used with the target base station after the handover, in case that the second information indicates not to change the security key, and
wherein central unit-access unit (CU-AU) split is applied to the source base station and the target base station, and the source base station and the target base station are connected to a same CU.

11. The method of claim 10, wherein the security key is used for a ciphering and a deciphering of a data associated with the target base station.

12. A method for performing a handover by a source base station in a wireless communication system, the method comprising:
receiving first information related to a handover from the source base station to a target base station and second information indicating whether to change a security key that has been used with the source base station; and
transmitting, to a terminal, a first message for a radio resource control (RRC) reconfiguration, the first message including the first information and the second information,
wherein a random access procedure is performed with the target base station based on the first information,
wherein a second message for an RRC reconfiguration complete is transmitted to the target base station,
wherein the security key is used with the target base station after the handover, in case that the second information indicates not to change the security key, and
wherein central unit-access unit (CU-AU) split is applied to the source base station and the target base station, and the source base station and the target base station are connected to a same CU.

13. The method of claim 12, wherein the security key is used for a ciphering and a deciphering of a data associated with the target base station.

14. A method for performing a handover by a target base station in a wireless communication system, the method comprising:
performing a random access procedure with a terminal based on first information related to a handover from a source base station to the target base station; and
receiving, from the terminal, a first message for a radio resource control (RRC) reconfiguration complete,
wherein a second message for an RRC reconfiguration is transmitted to the terminal from the source base station, the second message including the first information and second information indicating whether to change a security key that has been used with the source base station,
wherein the security key is used with the target base station after the handover, in case that the second information indicates not to change the security key, and
wherein central unit-access unit (CU-AU) split is applied to the source base station and the target base station, and the source base station and the target base station are connected to a same CU.

15. The method of claim 10,
wherein the handover is performed without a change of a user plane protocol for the terminal by reusing the user plane protocol, and
wherein the user plane protocol includes a packet data convergence protocol (PDCP).

16. The method of claim 12,
wherein the handover is performed without a change of a user plane protocol for the terminal by reusing the user plane protocol, and
wherein the user plane protocol includes a packet data convergence protocol (PDCP).

17. The method of claim 14, wherein the security key is used for a ciphering and a deciphering of a data associated with the target base station.

18. The method of claim 14,
wherein the handover is performed without a change of a user plane protocol for the terminal by reusing the user plane protocol, and
wherein the user plane protocol includes a packet data convergence protocol (PDCP).

* * * * *